(12) United States Patent
Jones et al.

(10) Patent No.: US 9,086,170 B2
(45) Date of Patent: Jul. 21, 2015

(54) HYDRAULIC VALVE FOR USE IN A CONTROL MODULE OF AN AUTOMATIC TRANSMISSION

(75) Inventors: Michael E. Jones, Royal Oak, MI (US); Dennis R. Que, Northville, MI (US)

(73) Assignee: BORGWARNER INC., Auburn Hills, MI (US)

( * ) Notice: Subject to any disclaimer, the term of this patent is extended or adjusted under 35 U.S.C. 154(b) by 46 days.

(21) Appl. No.: 13/377,628

(22) PCT Filed: Jun. 22, 2010

(86) PCT No.: PCT/US2010/039425
§ 371 (c)(1),
(2), (4) Date: Dec. 12, 2011

(87) PCT Pub. No.: WO2011/008428
PCT Pub. Date: Jan. 20, 2011

(65) Prior Publication Data
US 2012/0085436 A1  Apr. 12, 2012

Related U.S. Application Data

(60) Provisional application No. 61/221,224, filed on Jun. 29, 2009.

(51) Int. Cl.
*F16K 11/07* (2006.01)
*F16K 31/02* (2006.01)
(Continued)

(52) U.S. Cl.
CPC ........ *F16K 31/0613* (2013.01); *F16H 61/0251* (2013.01); *F16K 11/07* (2013.01); *F15B 2013/004* (2013.01); *F16H 2061/0253* (2013.01)

(58) Field of Classification Search
CPC . F16K 31/0613; F16K 11/07; F15B 13/0402; F16H 61/688; F16H 61/0251
USPC ............ 251/129.15, 366; 137/625.64, 625.69
See application file for complete search history.

(56) References Cited

U.S. PATENT DOCUMENTS 1,233,561 A   7/1917   Dornfeld
2,174,395 A   9/1939   Aikman
(Continued)

FOREIGN PATENT DOCUMENTS

DE   871857    7/1949
DE   953406    11/1956
(Continued)

OTHER PUBLICATIONS

Raw Machine translation for Foreign Patent Document JP-2000-220762.*
(Continued)

*Primary Examiner* — John K Fristoe, Jr.
*Assistant Examiner* — David Colon Morales
(74) *Attorney, Agent, or Firm* — Howard & Howard Attorneys PLLC (57) ABSTRACT

A hydraulic valve assembly (10) adapted to be mounted to a transmission control module (15) and having a valve body (12), a valve bore (16), and at least one pressure supply port (26) as well as at least one pressure control port (28) that establish fluid communication between a source of pressurized fluid and a component to be controlled by the valve assembly. A valve member (18) is supported in the valve bore (16) and is selectively movable between predetermined positions to direct the pressurized fluid between the pressure supply port (26) and the pressure control port (28). In addition, the hydraulic valve assembly (10) includes a biasing mechanism (80, 180, 280, 380) that is responsive to the flow of hydraulic fluid through the valve body to generate a biasing force acting on the valve body (12) in a direction toward the pressure supply port (26).

4 Claims, 7 Drawing Sheets

(51) Int. Cl.
  *F15B 13/04* (2006.01)
  *F16K 31/06* (2006.01)
  *F16H 61/02* (2006.01)
  *F15B 13/00* (2006.01)

(56) References Cited

U.S. PATENT DOCUMENTS

| | | | |
|---|---|---|---|
| 2,639,013 A | 5/1953 | Meschia | |
| 2,702,049 A | 2/1955 | Seeloff | |
| 2,919,778 A | 1/1960 | Aschauer | |
| 2,943,502 A | 7/1960 | Perkins et al. | |
| 3,040,408 A | 6/1962 | Schou | |
| 3,053,051 A | 9/1962 | Kelley | |
| 3,171,522 A | 3/1965 | Petrie et al. | |
| 3,313,385 A | 4/1967 | Föster | |
| 3,362,481 A | 1/1968 | Steinhagen | |
| 3,490,312 A | 1/1970 | Seitz et al. | |
| 3,534,824 A | 10/1970 | Davison, Jr. | |
| 3,537,556 A | 11/1970 | Pfeffer et al. | |
| 3,589,483 A | 6/1971 | Smith | |
| 3,612,237 A | 10/1971 | Honda | |
| 3,654,692 A | 4/1972 | Goetz | |
| 3,698,435 A * | 10/1972 | Evans | 137/625.18 |
| 3,760,918 A | 9/1973 | Wetrich et al. | |
| 3,823,801 A | 7/1974 | Arnold | |
| 3,834,503 A | 9/1974 | Maurer et al. | |
| 3,858,698 A | 1/1975 | Hause | |
| 4,023,444 A | 5/1977 | Murakami | |
| 4,081,065 A | 3/1978 | Smyth et al. | |
| 4,155,535 A | 5/1979 | Seamone | |
| 4,205,739 A | 6/1980 | Shelby et al. | |
| 4,219,246 A | 8/1980 | Ladin | |
| 4,220,178 A | 9/1980 | Jackson | |
| 4,270,647 A | 6/1981 | Leber | |
| 4,295,792 A | 10/1981 | Tachibana et al. | |
| 4,301,904 A | 11/1981 | Ahlen | |
| 4,361,060 A | 11/1982 | Smyth | |
| 4,372,434 A | 2/1983 | Aschauer | |
| 4,445,393 A | 5/1984 | Braun | |
| 4,449,416 A | 5/1984 | Huitema | |
| 4,458,318 A | 7/1984 | Smit et al. | |
| 4,461,188 A | 7/1984 | Fisher | |
| 4,476,748 A | 10/1984 | Morscheck | |
| 4,501,676 A | 2/1985 | Moorhouse | |
| 4,513,631 A | 4/1985 | Koivunen | |
| 4,540,078 A | 9/1985 | Wetrich | |
| 4,540,347 A | 9/1985 | Child | |
| 4,544,057 A | 10/1985 | Webster et al. | |
| 4,548,306 A | 10/1985 | Hartz | |
| 4,557,363 A | 12/1985 | Golan | |
| 4,622,866 A | 11/1986 | Ito et al. | |
| 4,627,312 A | 12/1986 | Fujieda et al. | |
| 4,646,891 A | 3/1987 | Braun | |
| 4,653,348 A | 3/1987 | Hiraiwa | |
| 4,662,249 A | 5/1987 | Miki et al. | |
| 4,667,534 A | 5/1987 | Kataoka | |
| 4,667,798 A | 5/1987 | Sailer et al. | |
| 4,680,987 A | 7/1987 | Morimoto | |
| 4,683,915 A * | 8/1987 | Sloate | 137/625.63 |
| 4,700,823 A | 10/1987 | Winckler | |
| 4,713,980 A | 12/1987 | Ida et al. | |
| 4,719,998 A | 1/1988 | Hiramatsu et al. | |
| 4,722,237 A | 2/1988 | McNinch, Jr. | |
| 4,732,253 A | 3/1988 | Hiramatsu et al. | |
| 4,747,744 A | 5/1988 | Dominique et al. | |
| 4,753,332 A | 6/1988 | Bieber et al. | |
| 4,766,774 A | 8/1988 | Tamai | |
| 4,790,418 A | 12/1988 | Brown et al. | |
| 4,802,564 A | 2/1989 | Stodt | |
| 4,808,015 A | 2/1989 | Babcock | |
| 4,827,784 A | 5/1989 | Muller et al. | |
| 4,841,803 A | 6/1989 | Hamano et al. | |
| 4,905,801 A | 3/1990 | Tezuka | |
| 4,911,031 A | 3/1990 | Yoshimura et al. | |
| 4,941,508 A | 7/1990 | Hennessy et al. | |
| 4,947,970 A | 8/1990 | Miller et al. | |
| 4,957,016 A | 9/1990 | Amedei et al. | |
| 4,976,594 A | 12/1990 | Bernstrom | |
| 5,050,714 A | 9/1991 | Kurihara et al. | |
| 5,069,656 A | 12/1991 | Sherman | |
| 5,152,726 A | 10/1992 | Lederman | |
| 5,174,420 A | 12/1992 | DeWald et al. | |
| 5,232,411 A | 8/1993 | Hayashi et al. | |
| 5,247,965 A * | 9/1993 | Oka et al. | 137/625.65 |
| 5,250,011 A | 10/1993 | Pierce | |
| 5,259,476 A | 11/1993 | Matsuno et al. | |
| 5,261,456 A * | 11/1993 | Patton et al. | 137/625.64 |
| 5,261,803 A | 11/1993 | Freeman | |
| 5,275,267 A | 1/1994 | Slicker | |
| 5,282,722 A | 2/1994 | Beatty | |
| 5,284,232 A | 2/1994 | Prud'Homme | |
| 5,299,920 A | 4/1994 | Stearns | |
| 5,305,863 A | 4/1994 | Gooch et al. | |
| 5,383,544 A | 1/1995 | Patel | |
| 5,395,217 A | 3/1995 | Hoffmann et al. | |
| 5,413,470 A | 5/1995 | Eisenmann | |
| 5,439,088 A | 8/1995 | Michioka et al. | |
| 5,444,623 A | 8/1995 | Genise | |
| 5,445,043 A | 8/1995 | Eaton et al. | |
| 5,450,934 A | 9/1995 | Maucher | |
| 5,469,943 A | 11/1995 | Hill et al. | |
| 5,474,428 A | 12/1995 | Kimura et al. | |
| 5,476,374 A | 12/1995 | Langreck | |
| 5,495,927 A | 3/1996 | Samie et al. | |
| 5,499,704 A | 3/1996 | Hays | |
| 5,505,286 A | 4/1996 | Nash | |
| 5,522,775 A | 6/1996 | Maruyama et al. | |
| 5,538,121 A | 7/1996 | Hering | |
| 5,554,019 A | 9/1996 | Hodge | |
| 5,577,588 A | 11/1996 | Raszkowski | |
| 5,584,776 A | 12/1996 | Weilant et al. | |
| 5,609,067 A | 3/1997 | Mitchell et al. | |
| 5,613,588 A | 3/1997 | Vu | |
| 5,630,773 A | 5/1997 | Slicker et al. | |
| 5,634,541 A | 6/1997 | Maucher | |
| 5,634,867 A | 6/1997 | Mack | |
| 5,662,198 A | 9/1997 | Kojima et al. | |
| 5,679,098 A | 10/1997 | Shepherd et al. | |
| 5,711,409 A | 1/1998 | Murata | |
| 5,720,203 A | 2/1998 | Honda et al. | |
| 5,732,736 A | 3/1998 | Ollivier | |
| 5,755,314 A | 5/1998 | Kanda et al. | |
| 5,782,710 A | 7/1998 | Kosik et al. | |
| 5,806,643 A | 9/1998 | Fitz | |
| 5,823,909 A | 10/1998 | Beim et al. | |
| 5,830,102 A | 11/1998 | Coffey | |
| 5,851,164 A | 12/1998 | Habuchi et al. | |
| 5,890,392 A | 4/1999 | Ludanek et al. | |
| 5,899,310 A | 5/1999 | Mizuta | |
| 5,908,100 A | 6/1999 | Szadkowski et al. | |
| 5,911,400 A * | 6/1999 | Niethammer et al. | 251/129.08 |
| 5,915,512 A | 6/1999 | Adamis et al. | |
| 5,918,715 A | 7/1999 | Ruth et al. | |
| 5,928,104 A | 7/1999 | Kimura et al. | |
| 5,944,042 A | 8/1999 | Takahashi et al. | |
| 5,950,781 A | 9/1999 | Adamis et al. | |
| 5,964,675 A | 10/1999 | Shimada et al. | |
| 5,966,989 A | 10/1999 | Reed, Jr. et al. | |
| 5,979,257 A | 11/1999 | Lawrie | |
| 6,000,510 A | 12/1999 | Kirkwood et al. | |
| 6,006,620 A | 12/1999 | Lawrie et al. | |
| 6,012,561 A | 1/2000 | Reed, Jr. et al. | |
| 6,026,944 A | 2/2000 | Satou et al. | |
| 6,044,719 A | 4/2000 | Reed, Jr. et al. | |
| 6,059,534 A | 5/2000 | Kotake et al. | |
| 6,062,361 A | 5/2000 | Showalter | |
| 6,065,363 A | 5/2000 | Schaller et al. | |
| 6,071,211 A | 6/2000 | Liu et al. | |
| 6,095,941 A | 8/2000 | Martin et al. | |
| 6,105,448 A | 8/2000 | Borschert et al. | |
| 6,109,410 A | 8/2000 | Costin | |
| 6,116,397 A | 9/2000 | Kosumi et al. | |
| 6,145,919 A | 10/2000 | Shimakura | |
| 6,145,398 A | 11/2000 | Bansbach et al. | |

(56) References Cited

U.S. PATENT DOCUMENTS

| | | | |
|---|---|---|---|
| 6,164,149 A | 12/2000 | Ohmori et al. | |
| 6,171,212 B1 | 1/2001 | Reuschel | |
| 6,186,299 B1 | 2/2001 | Ruth | |
| 6,189,669 B1 | 2/2001 | Kremer et al. | |
| 6,210,300 B1 | 4/2001 | Costin et al. | |
| 6,217,479 B1 | 4/2001 | Brown et al. | |
| 6,227,063 B1 | 5/2001 | Ohmori et al. | |
| 6,244,407 B1 | 6/2001 | Kremer et al. | |
| 6,269,293 B1 | 7/2001 | Correa et al. | |
| 6,269,827 B1 * | 8/2001 | Potter | 137/14 |
| 6,276,224 B1 | 8/2001 | Ueda et al. | |
| 6,286,381 B1 | 9/2001 | Reed, Jr. et al. | |
| 6,295,884 B1 | 10/2001 | Miyake et al. | |
| 6,299,565 B1 | 10/2001 | Jain et al. | |
| 6,321,612 B1 | 11/2001 | Leimbach et al. | |
| 6,334,371 B1 | 1/2002 | Stengel et al. | |
| 6,349,608 B1 | 2/2002 | Lenzi | |
| 6,364,809 B1 | 4/2002 | Cherry | |
| 6,378,302 B1 | 4/2002 | Nozawa et al. | |
| 6,389,916 B1 | 5/2002 | Fukuda | |
| 6,393,943 B1 | 5/2002 | Sommer et al. | |
| 6,415,213 B1 | 7/2002 | Hubbard et al. | |
| 6,419,062 B1 | 7/2002 | Crowe | |
| 6,427,550 B1 | 8/2002 | Bowen | |
| 6,435,049 B1 | 8/2002 | Janasek et al. | |
| 6,435,213 B2 | 8/2002 | Lou | |
| 6,438,952 B1 | 8/2002 | Nozawa et al. | |
| 6,463,821 B1 | 10/2002 | Reed, Jr. et al. | |
| 6,470,764 B1 | 10/2002 | Yamaguchi et al. | |
| 6,490,944 B1 | 12/2002 | Heinzel et al. | |
| 6,523,657 B1 | 2/2003 | Kundermann et al. | |
| 6,527,074 B1 | 3/2003 | Morishita | |
| 6,536,296 B2 | 3/2003 | Sakamoto et al. | |
| 6,602,161 B2 | 8/2003 | Hemmingsen et al. | |
| 6,615,966 B2 | 9/2003 | Kato | |
| 6,619,152 B2 | 9/2003 | Ochi et al. | |
| 6,626,056 B2 | 9/2003 | Albert et al. | |
| 6,631,651 B2 | 10/2003 | Petrzik | |
| 6,638,197 B2 | 10/2003 | Ogawa et al. | |
| 6,656,090 B2 | 12/2003 | Matsumura et al. | |
| 6,669,596 B1 | 12/2003 | Sefcik | |
| 6,685,437 B2 | 2/2004 | Koenig et al. | |
| 6,695,748 B2 | 2/2004 | Kopec et al. | |
| 6,715,597 B1 | 4/2004 | Buchanan et al. | |
| 6,736,751 B1 | 5/2004 | Usoro et al. | |
| 6,752,743 B2 | 6/2004 | Eich et al. | |
| 6,789,658 B2 | 9/2004 | Busold et al. | |
| 6,790,159 B1 | 9/2004 | Buchanan et al. | |
| 6,792,821 B1 | 9/2004 | Yamamoto | |
| 6,819,997 B2 | 11/2004 | Buchanan et al. | |
| 6,830,531 B1 | 12/2004 | Koenig et al. | |
| 6,832,978 B2 | 12/2004 | Buchanan et al. | |
| 6,834,562 B2 | 12/2004 | Esly et al. | |
| 6,868,949 B2 | 3/2005 | Braford, Jr. | |
| 6,869,382 B2 | 3/2005 | Leising et al. | |
| 6,883,394 B2 | 4/2005 | Koenig et al. | |
| 6,887,184 B2 | 5/2005 | Buchanan et al. | |
| 6,898,992 B2 | 5/2005 | Koenig et al. | |
| 6,909,955 B2 | 6/2005 | Vukovich et al. | |
| 6,953,417 B2 | 10/2005 | Koenig | |
| 6,957,665 B2 | 10/2005 | Shin et al. | |
| 6,969,043 B2 * | 11/2005 | Hirata et al. | 251/129.15 |
| 7,007,925 B2 * | 3/2006 | Nordstrom et al. | 251/129.15 |
| 7,073,407 B2 | 7/2006 | Stefina | |
| 7,127,961 B2 | 10/2006 | Braford et al. | |
| 7,155,993 B2 | 1/2007 | Koenig et al. | |
| 7,219,571 B2 | 5/2007 | McCrary | |
| 7,311,187 B2 | 12/2007 | Koenig et al. | |
| 7,318,512 B2 | 1/2008 | Bauer et al. | |
| 7,412,989 B2 * | 8/2008 | Segi et al. | 137/625.64 |
| 7,431,043 B2 | 10/2008 | Xiang et al. | |
| 7,856,999 B2 | 12/2010 | Xiang et al. | |
| 2001/0037698 A1 | 11/2001 | Yamamoto et al. | |
| 2002/0014386 A1 | 2/2002 | Diemer et al. | |
| 2002/0082131 A1 | 6/2002 | Park et al. | |
| 2002/0185351 A1 | 12/2002 | Berger et al. | |
| 2003/0057051 A1 | 3/2003 | Alfredsson | |
| 2003/0075413 A1 | 4/2003 | Alfredsson | |
| 2003/0178275 A1 | 9/2003 | Breier et al. | |
| 2004/0011817 A1 | 1/2004 | Colangelo et al. | |
| 2004/0060378 A1 | 4/2004 | Yamamoto et al. | |
| 2004/0060793 A1 | 4/2004 | Dacho et al. | |
| 2004/0138025 A1 | 7/2004 | Yamaguchi et al. | |
| 2004/0206599 A1 | 10/2004 | Hegerath | |
| 2005/0000774 A1 | 1/2005 | Friedmann | |
| 2005/0067251 A1 | 3/2005 | Braford, Jr. et al. | |
| 2005/0217740 A1 * | 10/2005 | Segi et al. | 137/625.65 |
| 2005/0279605 A1 | 12/2005 | Sowul et al. | |
| 2006/0005647 A1 | 1/2006 | Braford et al. | |
| 2006/0006042 A1 | 1/2006 | Koenig | |
| 2006/0006043 A1 | 1/2006 | Koenig et al. | |
| 2006/0009326 A1 | 1/2006 | Stefina | |
| 2006/0027773 A1 | 2/2006 | Nordstrom et al. | |
| 2006/0081298 A1 | 4/2006 | Segi et al. | |
| 2006/0174624 A1 | 8/2006 | Grabowski et al. | |
| 2007/0240919 A1 | 10/2007 | Carlson | |
| 2007/0284213 A1 | 12/2007 | Duhaime et al. | |
| 2009/0000677 A1 | 1/2009 | Inaguma et al. | |
| 2009/0057583 A1 * | 3/2009 | Van Weelden | 251/12 |
| 2009/0232673 A1 | 9/2009 | Reisch et al. | |

FOREIGN PATENT DOCUMENTS

| | | | |
|---|---|---|---|
| DE | 1146314 | 3/1963 | |
| DE | 1217800 | 5/1966 | |
| DE | 3149880 C2 | 7/1982 | |
| DE | 3118565 A1 | 11/1982 | |
| DE | 3532759 C1 | 3/1987 | |
| DE | 19700635 C2 | 8/1997 | |
| DE | 19631983 C1 | 2/1998 | |
| DE | 10012122 A1 | 9/2000 | |
| DE | 10034677 A1 | 2/2002 | |
| DE | 10049474 A1 | 4/2002 | |
| DE | 10118756 A1 | 5/2002 | |
| DE | 10115454 A1 | 8/2002 | |
| DE | 10156789 A1 | 8/2002 | |
| DE | 10125172 A1 | 11/2002 | |
| DE | 10143834 A1 | 3/2003 | |
| EP | 0120617 A1 | 10/1984 | |
| EP | 0762009 A1 | 3/1997 | |
| EP | 0848179 A1 | 6/1998 | |
| EP | 1195537 A1 | 4/2002 | |
| EP | 1420185 A2 | 11/2003 | |
| EP | 1531292 A2 | 11/2004 | |
| EP | 1703178 A2 | 9/2006 | |
| EP | 1788288 A2 | 5/2007 | |
| EP | 1950076 A1 | 7/2008 | |
| FR | 1246517 | 10/1960 | |
| FR | 2123828 | 8/1972 | |
| GB | 2036203 A | 6/1980 | |
| GB | 2356438 A | 5/2001 | |
| JP | 4366032 | 12/1992 | |
| JP | 8200393 | 8/1996 | |
| JP | 2000220762 A * | 8/2000 | F16K 31/06 |
| JP | 2001206108 A | 7/2001 | |
| JP | 2003-247656 A | 9/2003 | |
| JP | 2004-176895 A | 6/2004 | |
| JP | 2005147403 | 6/2005 | |
| JP | 2007263302 A | 10/2007 | |
| JP | 20098159 A | 1/2009 | |
| JP | 2009008159 A * | 1/2009 | |
| WO | 2004005744 A1 | 1/2004 | |
| WO | 2006086704 A2 | 8/2006 | |
| WO | 2009128806 A1 | 10/2009 | |

OTHER PUBLICATIONS

Raw Machine translation for Foreign Patent Document JP-2009-008159.*

(56) References Cited

OTHER PUBLICATIONS

Raw Machine translation for Foreign Patent Document JP-2007-263302 referred as "Jatco".*
Machine translation of Toyoda (JP2004176895A Published on Jun. 24, 2004) provided by the EPO.*
Jul. 9, 2010 International Search Report for PCT/US2009/066674.
Feb. 28, 2011 International Search Report for PCT/US2010/039425.
Jan. 30, 2014 European Search Report for 10800235.3-175.
Oct. 1, 2014 European Office Action for Application No. 10 800 235.3-1751.

* cited by examiner

HYDRAULIC VALVE FOR USE IN A CONTROL MODULE OF AN AUTOMATIC TRANSMISSION

BACKGROUND OF THE INVENTION

1. Field of the Invention

The present invention relates, generally, to hydraulic valves and, more specifically, to hydraulic valves for use in the control modules of automatic transmissions.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle.

Most automatic transmissions are controlled by hydraulically actuating the various components within the transmission. Thus, it is important to provide a stable hydraulic pressure for these devices. To this end, a pump is employed to provide pressurized hydraulic fluid for the control and actuation of the transmission. In addition, the clutches and gear assemblies are lubricated and cooled by a secondary flow of the hydraulic fluid. Typically, the pump is mechanically driven by a power take-off from the engine. Thus, the hydraulic pressure delivered from the pump increases as the pump speed increases in response to an increase in engine speed. Since hydraulically actuated devices respond in a predetermined and precise manner for the given pressure applied to actuate them, inaccurate control of the hydraulic pressure causes inaccurate operation and control of the automatic transmission.

To address the changes in the hydraulic pressure delivered by the pump as engine speed changes, automatic transmissions typically include a hydraulic control module that employs a plurality of hydraulic valves. A number of the valves of the type commonly employed in the hydraulic circuit of the transmission may include a valve member slidably disposed within a valve body. The valve member moves back and forth over the various ports of the valve body to direct and control the fluid flow between the ports. The valve bodies are typically received in corresponding bores formed in the control module.

The hydraulic valves may be fixedly mounted to the control module in a number of ways. For example, the valve assembly may employ a flange that is bolted to the control module using fasteners. Alternatively, the valve may employ O-rings or other seals disposed about the outer circumference of the valve body and that sealingly engage with the inner diameter of the bore formed in the control module.

While these mounting systems have generally worked for their intended purpose, certain disadvantages are presented when using these mounting strategies. For example, flange-mounted valves suffer from the disadvantage of high-costs associated with the number of fasteners needed to mount a plurality of valves to the control module. In addition, there is an ongoing need to minimize the space or "packaging" associated with transmission components, including the control module. However, both flange-mounted and O-ring sealed hydraulic valves suffer from the disadvantage that they are relatively long and thus present a larger profile. This requires more space to mount them to the control module, and thereby increases the "package" of the control module.

Partly due to these deficiencies, hydraulic valves were developed that have valve bodies that are "slip fit" into the bores formed in the control module. The tolerance between the valve body and the bore are designed such that the valve assemblies are fixedly retained in the bore. This "slip fit" mounting approach allows for a shorter valve body and thus a lower profile valve assembly. This also allows the size or "package" of the control module to be reduced.

Unfortunately, valve assemblies that are slip-fit mounted to control modules used in automatic transmissions suffer from the disadvantage that they tend to leak around the outer diameter of the valve body in the bore. Leakage of this type is not insignificant when the number of hydraulic valves employed for a transmission control unit is taken into consideration. Thus, larger capacity pumps have been employed in order to account for this defect. However, larger capacity pumps have higher costs to manufacture, and require more energy to operate. Alternatively leakage may be reduced by employing tighter clearances and less tolerance between the valve body and the bore in the control module. However, this requires additional machining and also increases the cost of manufacturing the valve and the control module. In view of the ongoing need to reduce costs and improve fuel economy, the slip-fit approach to mount a hydraulic valve to a transmission control module has been deemed problematic.

Thus, there remains a need in the art for a hydraulic valve that may be quickly and easily slip-fit mounted to a hydraulic control module for an automatic transmission at low cost, and that has a low profile and facilitates a smaller package for the control module. In addition, there remains a need in the art for a slip-fit mounted hydraulic valve having improved leakage characteristics so that smaller capacity pumps having lower energy requirements may be used to pressurize the transmission's hydraulic circuit.

SUMMARY OF THE INVENTION

The present invention overcomes the deficiencies in the related art in a hydraulic valve assembly that is adapted to be mounted to a transmission control module. The hydraulic valve includes a valve body that is adapted to be received and retained in the bore of the transmission control module. The valve body has a valve bore extending axially along the length of the valve body. At least one pressure supply port provides fluid communication between a source of pressurized fluid and the valve bore. In addition, at least one pressure control port provides fluid communication between the valve bore and a component controlled by the transmission control unit. A valve member is supported in the valve bore and is selectively movable between predetermined positions to direct pressurized fluid between the pressure supply port and the pressure control port. In addition, the hydraulic valve assembly of the present invention includes a biasing mechanism that is responsive to the flow of hydraulic fluid through the valve body and that generates a biasing force acting on the valve body in a direction toward the pressure supply port to improve the seal of the valve body against the bore of the transmission control module at the pressure supply port.

In this way, the hydraulic valve assembly of the present invention may be quickly and easily slip-fit mounted to the hydraulic control module for an automatic transmission without the need for additional fasteners, seals, and the like. The particular mounting strategy employed herein also provides for a low-profile and that facilitates a smaller package for the control module. In addition, the slip-fit mounted hydraulic valve assembly of the present invention has improved leakage characteristics so that smaller capacity pumps having lower energy requirements may be employed to pressurize the transmission's hydraulic circuit.

Other objects, features, and advantages of the present invention will be readily appreciated, as the same becomes better understood after reading the subsequent description taken in connection with the accompanying drawings.

DETAILED DESCRIPTION

A hydraulic valve assembly of the present invention is generally indicated at 10 in FIGS. 1, 2-3, 5-6, 8-9, and 11-12, where like numerals are used to designate like structure throughout the figures. The hydraulic valve 10 is particularly useful as a component of a control module of a hydraulic transmission. However, from the description that follows, those having ordinary skill in the art will appreciate that the hydraulic valve 10 of the present invention is not limited for use solely in a hydraulic control module. Thus, reference to such control modules in the description that follows is only for purposes of context and to better describe the features of the present invention. The hydraulic valve assembly 10 of the present invention is illustrated in four embodiments shown in FIGS. 2-4; 5-7; 8-10; and 11-13. Each of these embodiments has common components that will be described first with reference to FIGS. 1-3. Each of the common components is designated with the same reference numeral throughout the figures. The differences between the embodiments will be described with reference to specific figures using reference numbers increased by 100 throughout the figures. The hydraulic valve 10 includes a valve body, generally indicated at 12, and a solenoid assembly, generally indicated at 14. As noted above, both of these components will be described in greater detail below with reference to FIGS. 1-3.

Figure 1:
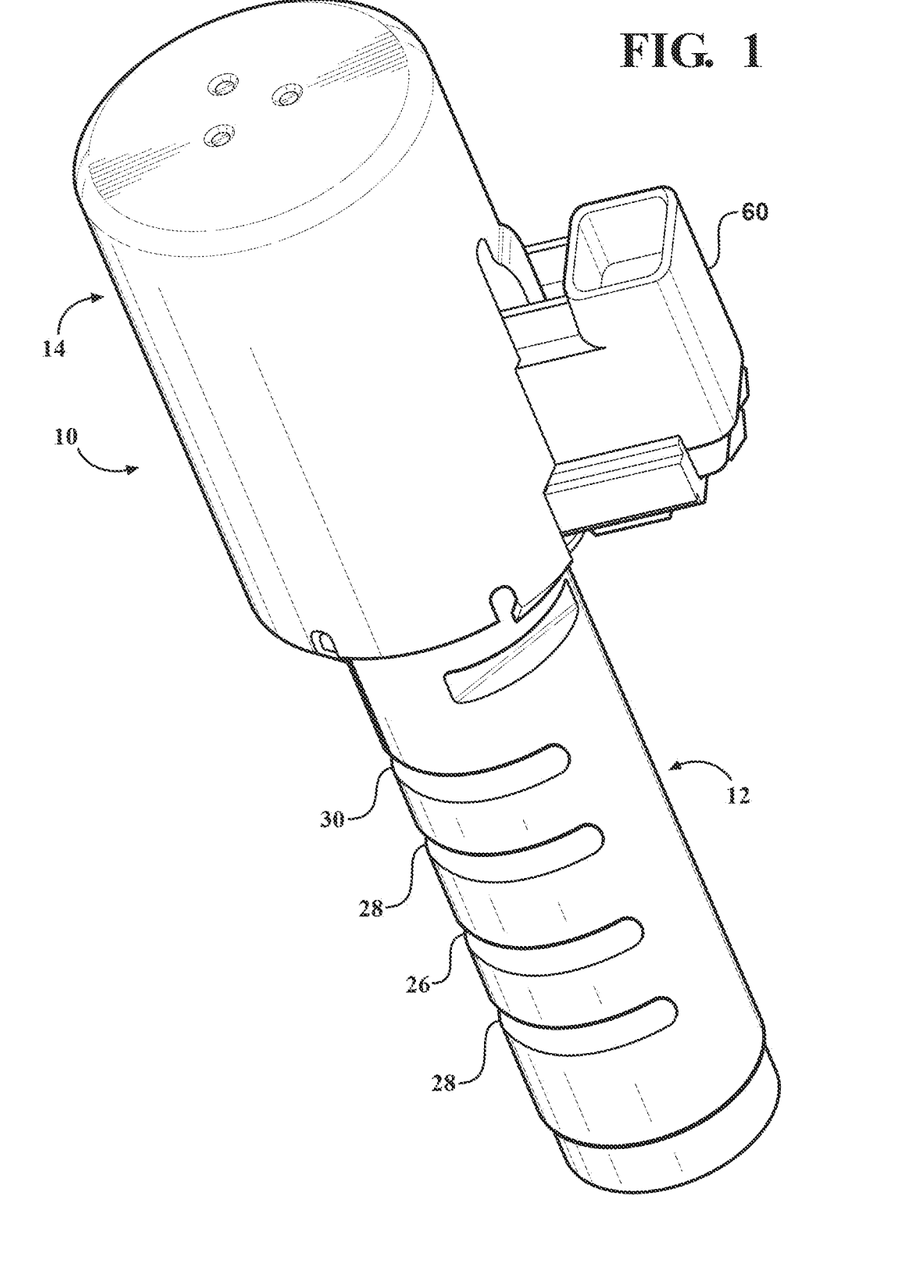
FIG. 1 is a perspective elevational view of one representative embodiment of a hydraulic valve assembly of the present invention.
Figure 2:
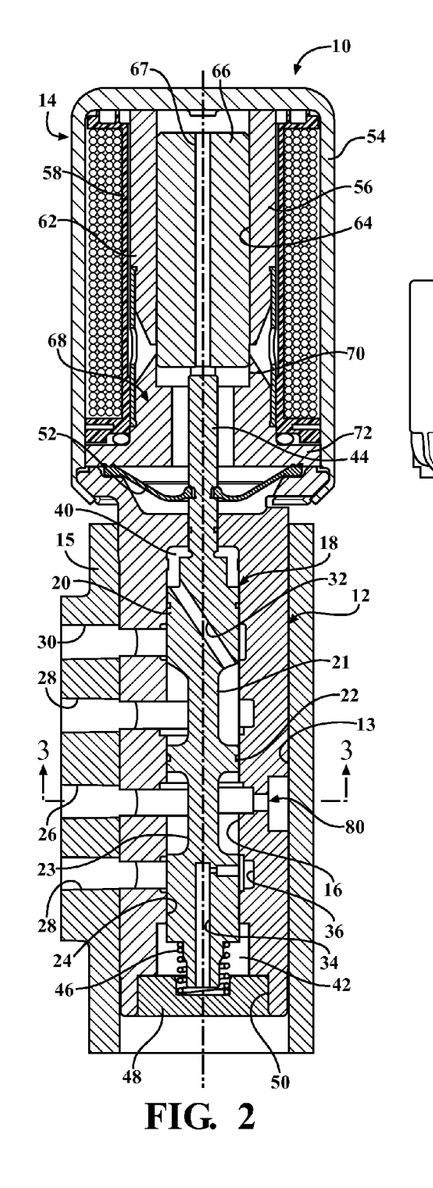
FIG. 2 is a cross-sectional side view of one embodiment of the hydraulic valve assembly of the present invention.
Figure 3:
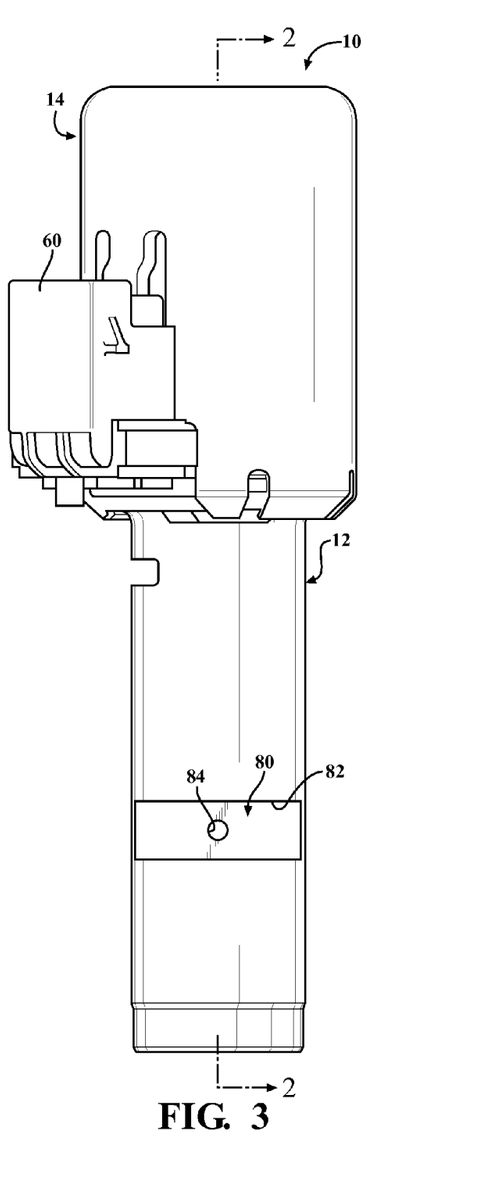
FIG. 3 is an elevational top view of the valve body of the hydraulic valve illustrated in FIG. 2.

More specifically, the valve body 12 may define a cylindrical sleeve-like element that is adapted to be received in a corresponding bore 13 formed in a hydraulic control module that is representatively illustrated at 15. The control module is in communication with a source of pressurized fluid (such as a hydraulic pump) that is delivered to the valve body 12 as is commonly known in the art. The valve body 12 may be fixedly retained in the corresponding bore in the control module in any manner known in the related art. However, in the representative example illustrated in this figure, the valve body is designed to be slip-fit into the bore and retained by interference between the outer circumference of the valve body and the inner circumference of the corresponding bore as will be described in greater detail below.

The valve body 12 includes a valve bore 16 and a valve member, generally indicated at 18 that is movably supported in the valve body 12 between predetermined positions as will be described in greater detail below. The valve member 18 includes a plurality of lands 20, 22 and 24 that are disposed in sealing engagement with the valve bore 16 and employed to direct the flow of hydraulic fluid through the valve body 12. A reduced diameter portion 21 may extend between lands 20 and 22 while a reduced diameter portion 23 may extend between lands 22 and 24. The valve body 12 includes at least one pressure supply port 26 that establishes fluid communication between the source of pressurized hydraulic fluid and the valve bore 16. The valve body 12 also includes at least one pressure control port 28 that establishes fluid communication between the valve bore 16 and a component to be controlled by the hydraulic valve and the valve bore 16. These components may include any number of various clutches, synchronizers, or other hydraulically actuated components commonly found in a transmission.

In the representative example illustrated here, the valve body includes a pair of pressure control ports 28 that establish fluid communication between the valve bore 16 and at least one component to be controlled by the hydraulic valve. The valve body 12 may also include at least one exhaust port 30 for exhausting pressurized fluid from the valve body when the hydraulic valve assembly 10 is in its "off" position. The valve body 12 also includes a feedback channels 32, 34 are formed generally through lands 20 and 24. The feedback channel 32 extends through the land 20 to establish fluid communication between the void defined by reduced diameter portion 21 of the valve member 18 and the valve bore 16 and a control chamber 40. The control chamber 40 is defined in the valve bore closest to the solenoid 14. The feedback channel 34 extends through land 24 so as to establish fluid communication between an annular port 36 defined in the valve bore 16 and a control chamber 42. The control chamber 42 is located in the valve bore opposite from the control chamber 40. The annular port 36 is in fluid communication with one of the control ports 28.

The valve member 18 includes a push rod 44 that is mechanically influenced by the solenoid assembly 14 to move the valve member 18 downwardly as viewed in FIG. 2. A biasing member 46 is employed to bias the valve member 18 in a direction opposite the movement induced by the solenoid assembly 14, as will be described in greater detail below. In the representative embodiment illustrated herein, the biasing member is a coiled return spring 46 disposed between the land 24 of the valve member 18 and a plug 48 that closes the otherwise open end 50 of the valve bore. From the description that follows, those having ordinary skill in the art will appreciate that the valve body 12, the valve member 18, as well as all associated ports and other related structure can take a number of different forms while still performing the function required by the solenoid actuated hydraulic valve of the present invention. Thus, the hydraulic valve of the present invention is in no way limited to the specific structure of the valve body 12 and all related components illustrated herein.

The valve body 12 is operatively mounted to the solenoid assembly 14 in a manner that seals the solenoid assembly 14 from contact with hydraulic fluid flowing through the valve body 12. To this end, the pushrod 44 is received through an opening in a diaphragm 52 that is fixedly clamped between the valve body 12 and the solenoid assembly 14. The solenoid assembly 14 includes a housing or "can" 54 and a solenoid coil 56 supported in the housing 54 about a bobbin 58. The solenoid coil 56 consists of wire wrapped around the bobbin 58 and that generates an electromagnetic flux when subjected to a current flowing through the coil 56 as is commonly known in the art. To this end, the solenoid assembly 14 is in communication with a source of electrical power via the connector assembly 60 shown in FIGS. 1 and 3.

A flux tube 62 is fixedly mounted in the housing 54 and defines an inner space 64. An armature 66 is movably supported in the space 64 defined by the flux tube 62 under the influence of the electromagnetic flux as will be described in greater detail below. The armature 66 may also include a vent port 67 that allows the armature 66 to move reciprocally within the space 64 defined by the flux tube 62. The solenoid assembly 14 also includes a pole piece, generally indicated at 68, that is fixedly supported in the housing 54 and disposed opposite the armature 66. As best shown in FIG. 2, the pole piece 68 has a shunt portion, generally indicated at 70 that faces the armature 66 as shown in FIG. 2. The pole piece 68 includes an annular base 72. The armature 66 is movable toward the pole piece 18 under the influence of the electromagnetic flux generated by a pulse of current flowing through the solenoid coil 56. In turn, the armature 66 acts on the valve member 18 through the pushrod 44 to move the valve member 18 between predetermined positions.

Pressurized hydraulic fluid flows through the pressure supply port 26, past lands 20, 22 or 24, through the valve bore 16 and out the pressure control ports 28 or exhaust port 30 as dictated by the position of the valve member 18 in the valve bore that is moved in response to the action of the solenoid assembly 14 and the return biasing member 46. Pressurized hydraulic fluid also flows through the feedback channels 32, 34 to balance the pressure on either side of the valve member 18. In this way, the hydraulic valve assembly 10 is controlled to direct hydraulic fluid from the pressure supply port 26 through the valve bore 16 and to the pressure control ports 28 or exhaust port 30 as the need arises.

Thus, the hydraulic valve assembly 10 of the present invention is designed to be slip-fit into the bore formed in the hydraulic control module. This approach allows the use of shorter valve assemblies having a lower profile which translates into a control module that likewise has a lower profile. This feature improves packaging aspects of both the hydraulic valve assembly as well as the control module with which it may be used. However, the slip-fit hydraulic valve assemblies known in the related art typically suffer from the disadvantage that they tend to leak around the supply ports. Leakage around the supply ports also tends to cause leakage along the length of the valve body at the interface with the bore in the control module. In order to address this defect, each of the embodiments of the hydraulic valve assembly 10 of the present invention employ a biasing mechanism, generally indicated at 80, 180, 280, and 380 in FIGS. 2-4, 5-7, 8-10 and 11-13, respectively. Each of the biasing mechanisms generate a biasing force that acts on the valve body in a direction toward the pressure supply port to seal the valve body against the bore of the transmission control module at the pressure supply port. In this way, leakage around the pressure supply port and other places along the valve body are reduced. Additional details of each of the biasing mechanisms employed in the embodiments illustrated in the figures will now be described in greater detail below with reference to the specific figure illustrating that embodiment using reference numbers that increase by a factor of 100 between the different embodiments.

Figure 4:
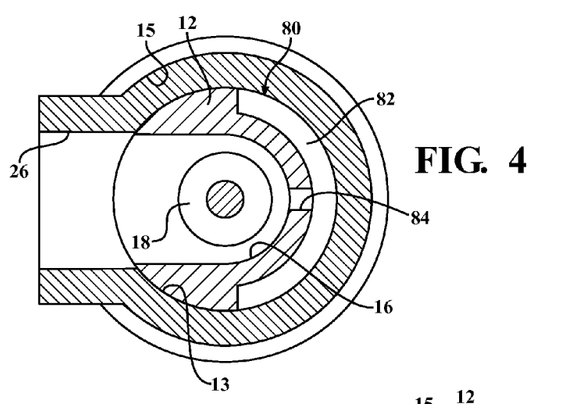
FIG. 4 is a cross-sectional end view of the valve body of the hydraulic valve illustrated in FIG. 2.

More specifically, and referring now to FIG. 2, the biasing mechanism illustrated with respect to the hydraulic valve assembly shown therein is responsive to the flow of hydraulic fluid through the valve body to generate this biasing force. To this end, the biasing mechanism 80 illustrated in FIGS. 2-4 includes a channel 82 formed on the outer circumference of the valve body opposite to the pressure supply port 26. The channel 82 is in fluid communication with the pressure supply port via passage 84 and is adapted to define a hydraulic biasing reservoir in conjunction with an arcuate portion of the bore and the transmission control mechanism. Hydraulic fluid flowing into the reservoir generates a force acting in a direction toward the pressure supply port 26 to seal the pressure supply port 26 against the bore of the transmission control module. As best shown in FIGS. 3-4, the channel extends substantially arcuately about the longitudinal axis of the valve bore.

Figure 5:
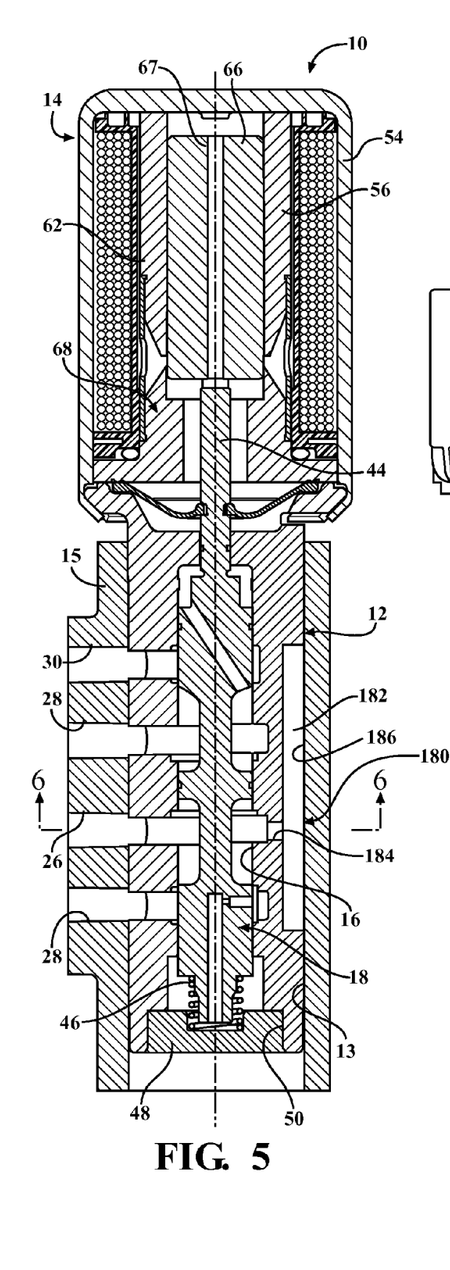
FIG. 5 is a cross-sectional side view of another embodiment of the hydraulic valve assembly of the present invention.
Figure 6:
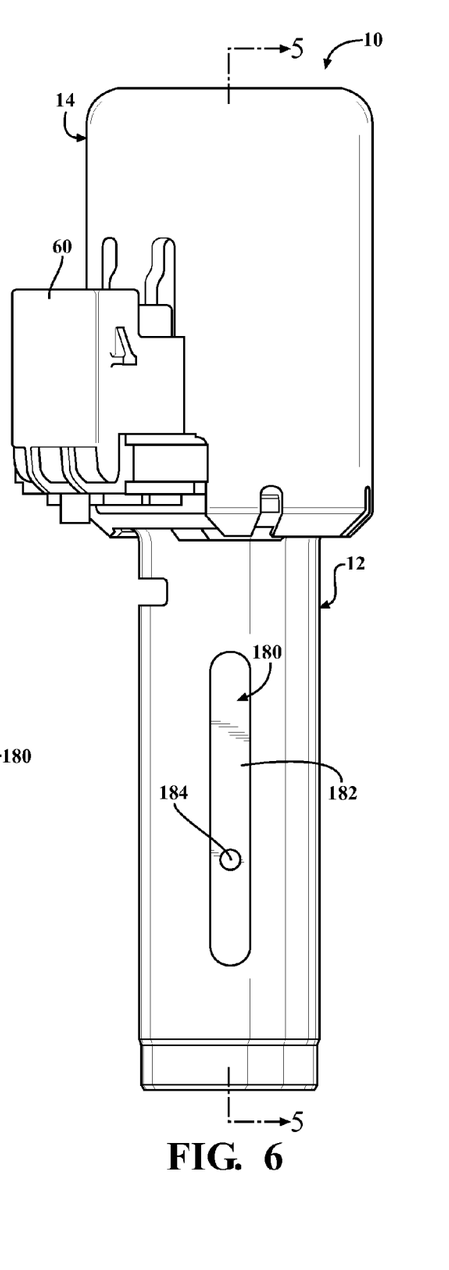
FIG. 6 is an elevational top view of the valve body of the hydraulic valve assembly illustrated in FIG. 5.
Figure 7:
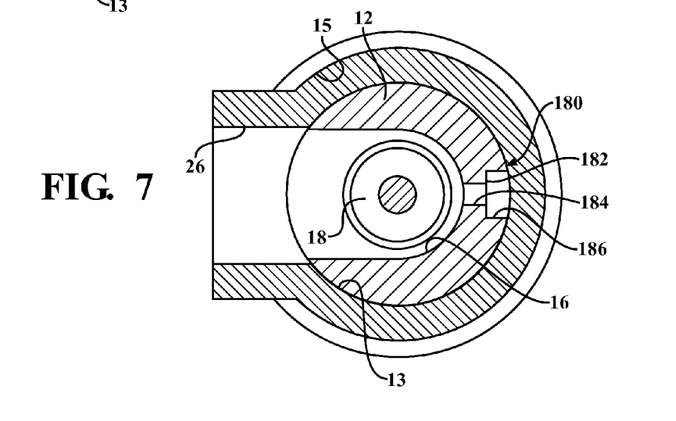
FIG. 7 is a cross-sectional end view of the valve body of the hydraulic valve assembly illustrated in FIG. 5.

Alternatively, and in the embodiment illustrated in FIGS. 5-7, the biasing mechanism 180 includes a channel 182 that extends substantially in the direction of the longitudinal axis of the valve bore 16. More specifically, the channel 182 is in fluid communication with the pressure supply port 26 via passage 184 and is adapted to define a hydraulic biasing reservoir in conjunction with an axially extending portion of the bore 13 of the transmission control module 15. Hydraulic fluid flowing into the reservoir defined by the channel 182 generates a force acting in a direction toward the pressure supply ports 26 as well as control port 28 and exhaust port 30 to seal the ports against the bore 13 of the transmission module 15. Thus, in both embodiments illustrated in FIGS. 2-7, the channels 82 and 182 generate a force acting in a direction toward the pressure supply port to seal the pressure supply port against the bore of the transmission control module.

Alternatively, the biasing mechanisms 80 or 180 may include a bladder that is disposed in a respective channel 82, 182 and located between the channel and the bore 13 defined in the transmission module 15. The use of this bladder is shown in connection with the embodiment illustrated in FIGS. 5-7. Thus, the biasing mechanism 180 may also employs a bladder 186 disposed in the channel 182 located between the channel 182 and the bore 13 defined in the transmission module 15. The bladder 186 serves to further seal the channel 182 with respect to the bore 13 of the transmission control module 15.

Figures 8, 9:
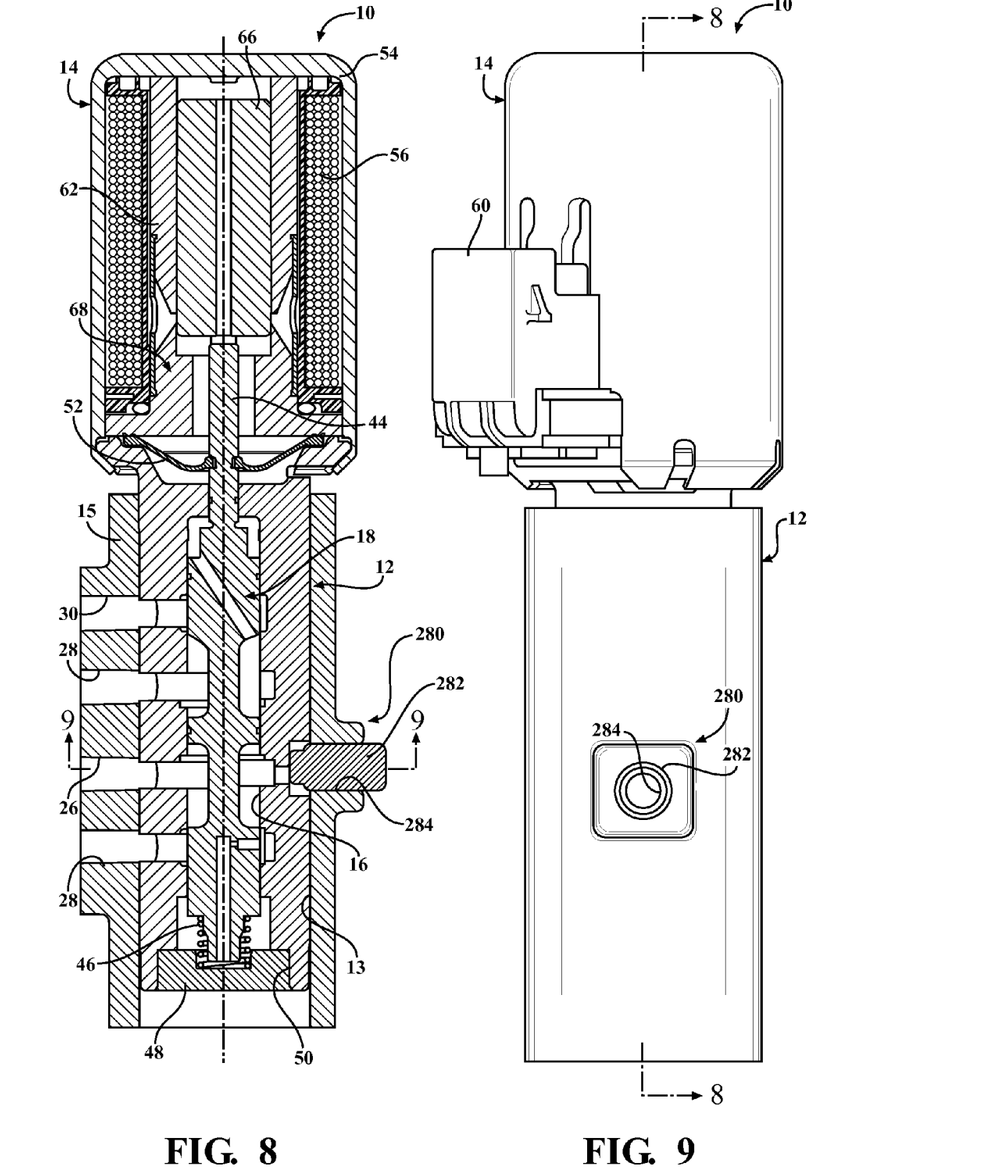
FIG. 8 is a cross-sectional side view of another embodiment of the hydraulic valve assembly of the present invention.
FIG. 9 is an elevational top view of the valve body of the hydraulic valve assembly illustrated in FIG. 8.
Figure 10:
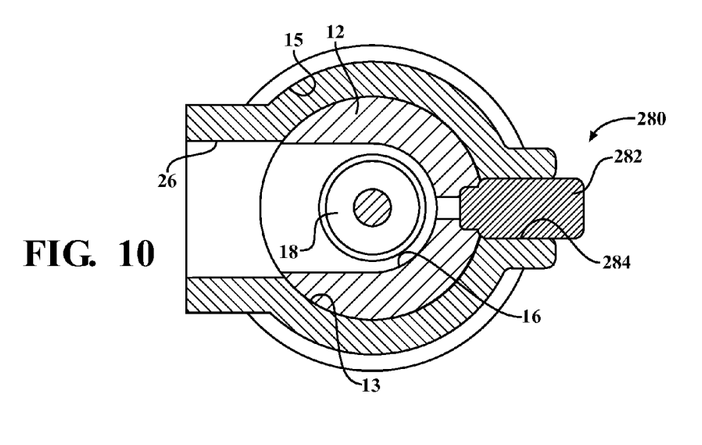
FIG. 10 is a cross-sectional end view of the valve body of the hydraulic valve assembly illustrated in FIG. 8.

Referring now to FIGS. 8-10, the biasing mechanism 280 of the present invention may include a set screw 282 that is disposed through a threaded aperture 284 defined at the outer portion of the control module 15 so that the screw 282 bears against the outside circumference of the valve body 12 opposite to the pressure supply port 26. The set screw 282 generates a force acting in a direction toward the pressure supply port 26 to seal the pressure supply port 26 against the bore of the transmission control module. To this end, the set screw 282 may be threadably and adjustably received in the threaded aperture 284. Adjustment of the set screw 282 in the aperture 284 adjusts the biasing force generated by this screw 282.

Figures 11, 13:
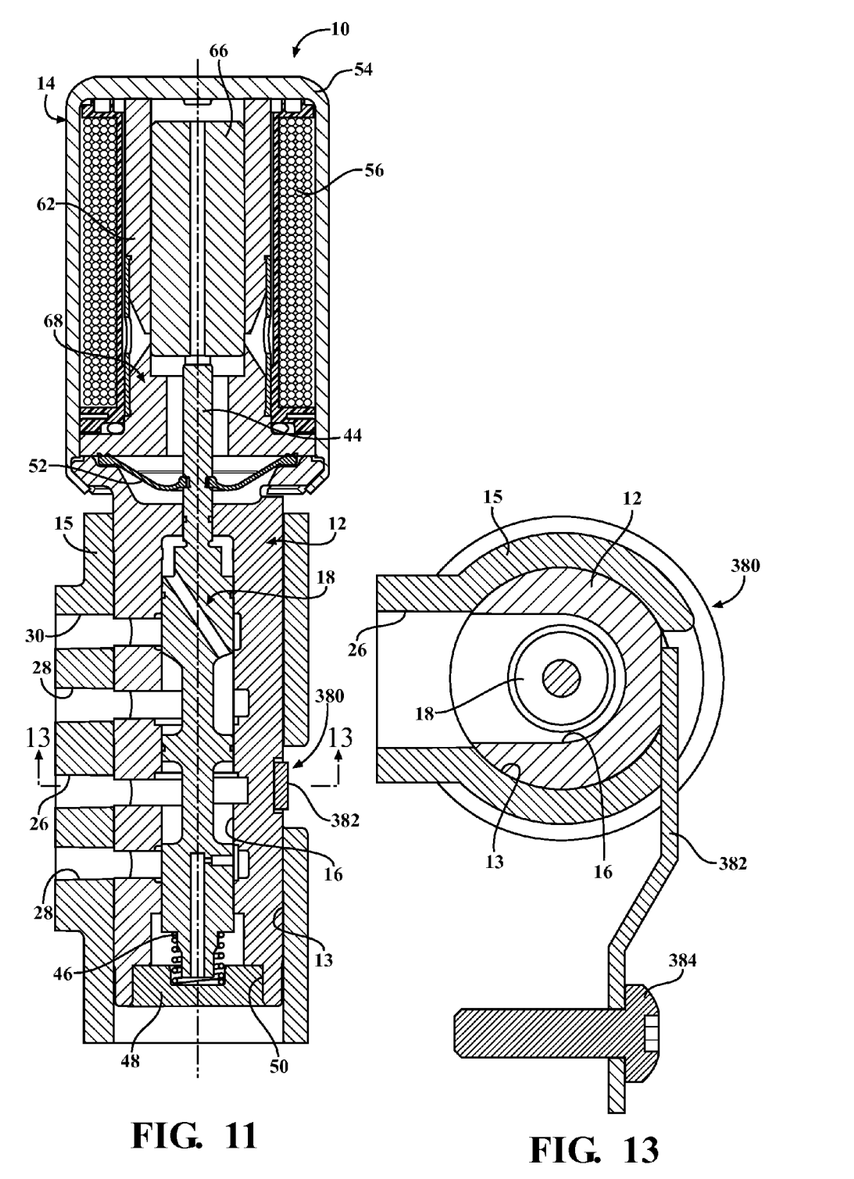
FIG. 11 is a cross-sectional side view of another embodiment of the hydraulic valve assembly of the present invention.
FIG. 13 is a cross-sectional end view of the valve body of the hydraulic valve assembly illustrated in FIG. 11.
Figure 12:
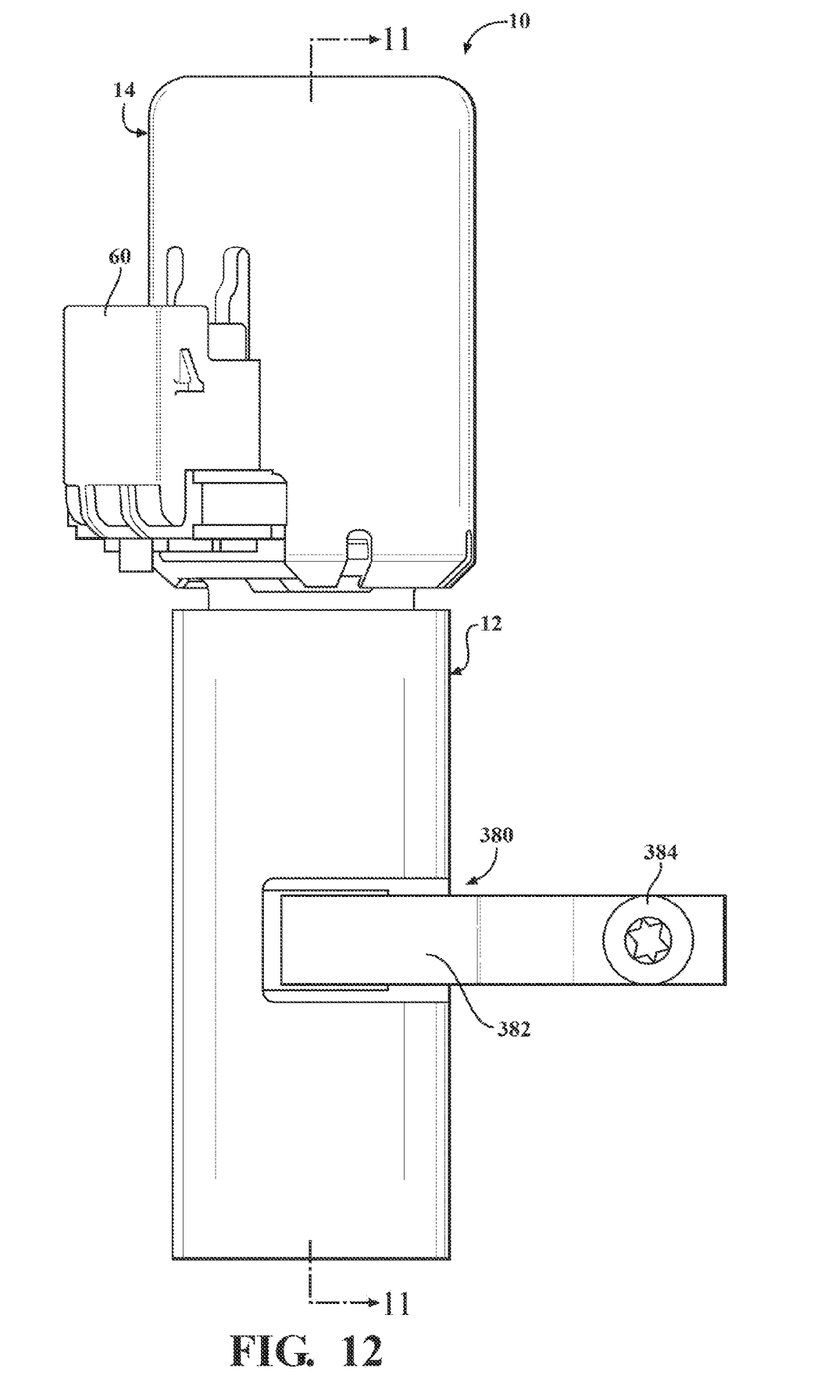
FIG. 12 is an elevational top view of the valve body of the hydraulic valve assembly illustrated in FIG. 11.

Finally, and referring specifically to FIGS. 11-13, the biasing mechanism 380 may include a bracket 382 that is disposed at the outer circumference of the valve body 12 opposite to the pressure supply port 26. The bracket 382 may be mounted to associated structure via a fastener such as a bolt 384 or the like. The bracket 382 generates a biasing force acting in a direction toward the pressure supply port 26 to seal the pressure supply port 26 against the bore 13 of the transmission control module 15 in the same way as is done with respect to the embodiments discussed above.

In this way, the biasing mechanisms 80, 180, 280, and 380 illustrated in FIGS. 2-13 act to reduce any leakage that may otherwise occur around the valve body 12 in a slip-fit configuration, while still retaining the advantages related to a lower profile valve assembly as well as a hydraulic control module.

The invention has been described in an illustrative manner. It is to be understood that the terminology that has been used is intended to be in the nature of words of description rather than of limitation. Many modifications and variations of the invention are possible in light of the above teachings. Therefore, within the scope of the claims, the invention may be practiced other than as specifically described.

We claim:

1. A hydraulic valve assembly (10) adapted to be mounted to a transmission control module (15), said hydraulic valve comprising:

a valve body (12) adapted to be received and retained in the bore (13) of the transmission control module (15), said valve body (12) having a valve bore (16) extending axially along the length of said valve body (12), at least one pressure supply port (26) providing fluid communication between a source of pressurized fluid and said valve bore (16), and at least one pressure control port (26) providing fluid communication between said valve bore (16) and a component controlled by the transmission control unit, a valve member (18) supported in said valve bore (16) and selectively moveable between predetermined positions to direct pressurized fluid between said pressure supply port (26) and said pressure control port (28);

a channel (80) formed on the outer circumference of said valve body (12), said channel having first and second ends and extending substantially arcuately about the longitudinal axis of said valve bore (16) opposite to said pressure supply port (26) such that said first and second ends are disposed in spaced angular relationship with respect to the longitudinal axis of said valve bore (16), said channel being in fluid communication with said pressure supply port (26) and adapted to define a hydraulic biasing reservoir generating a force acting in a direction toward said pressure supply port (26) to improve the seal of said pressure supply port against the bore (13) of the transmission control module (15).

2. The hydraulic valve assembly (10) as set forth in claim 1 further including a bladder (186) disposed in said channel (82) and between said channel (82) and the bore (13) defined in the transmission control module (15).

3. A hydraulic valve assembly (10) adapted to be mounted to a transmission control module (15), said hydraulic valve comprising:

a valve body (12) adapted to be received and retained in the bore (13) of the transmission control module (15), said valve body (12) having a valve bore (16) extending axially along the length of said valve body (12), at least one pressure supply port (26) providing fluid communication between a source of pressurized fluid and said valve bore (16), and at least one pressure control port (28) providing fluid communication between said valve bore (16) and a component controlled by the transmission control unit, a valve member (18) having at least two lands supported in said valve bore (16), said valve member (18) selectively moveable between predetermined positions to direct pressurized fluid between said pressure supply port (26) and said pressure control port (28);

a channel (182) formed on the outer circumference of said valve body (12) and extending substantially in the direction of the longitudinal axis of said valve bore (16) opposite to said pressure supply port (26) and so as to substantially span the distance between said at least two lands of said valve member (18), said channel (182) being in fluid communication with said pressure supply port (26) and adapted to define a hydraulic biasing reservoir generating a force acting in a direction toward said pressure supply port (26) to improve the seal of said pressure supply port against the bore (13) of the transmission control module (15).

4. The hydraulic valve assembly (10) as set forth in claim 3 further including a bladder (186) disposed in said channel (182) and between said channel (182) and the bore (13) defined in the transmission control module (15).

* * * * *